Patented Jan. 23, 1951

2,538,766

UNITED STATES PATENT OFFICE 2,538,766

TRIACYL-PHENYLPROPANEAMINODIOLS

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,176

8 Claims. (Cl. 260—477)

This application is a continuation-in-part of our copending application Serial No. 15,264, now U. S. Patent 2,483,884, filed March 16, 1948, and the invention relates to new chemical compounds and to chemical methods useful for their synthesis. More particularly, the invention relates to a new class of polyacylated amino diols and to methods for obtaining these products. The polyacylated amino diols of the invention can be represented by the formula,

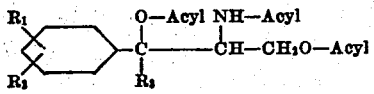

where $R_1$ and $R_2$ are the same or different and represent hydrogen, halogen, lower alkyl or lower alkoxy radicals and $R_3$ is hydrogen or a lower alkyl radical. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like radicals.

It will be appreciated by those skilled in the art that the products and starting materials of the invention can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" [reg.] series or form and to the trans diastereoisomers as the "pseudo" [ψ] series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro [d] and levo [l] rotatory isomers as as well as in the form of the individual or separated dextro [d] and levo [l] optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula should be interpreted in its generic sense, that is, as representing the [l]-ψ, [d]-ψ, [l]-reg. or [d]-reg. isomers in separated form as well as the [dl]-ψ or [dl]-reg. optical racemates or the total unresolved mixture of structural and optical isomers. Such a formula does not merely represent the unresolved mixture of isomers.

In accordance with the invention polyacylated amino diols of the above general formula are produced by acylating a compound of formula,

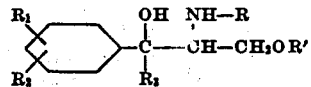

where $R_1$, $R_2$ and $R_3$ have the same significance as given above and R and R' are the same or different and represent hydrogen or acyl radicals, R' being hydrogen when R is hydrogen. As acylating agents acyl anhydrides or halides either alone or in conjunction with alkaline catalysts may be used.

In carrying out the acylation under substantially anhydrous conditions with an acyl anhydride the reaction mixture is heated at about 100° C. or above. When a temperature in the neighborhood of 100° C. is employed the heating is continued for at least one hour and preferably slightly longer. While at higher temperatures slightly less than one hour usually suffices to bring about the reaction. When an alkaline substance or catalyst is employed the reaction can be carried out at about room temperature, that is, 20 to 35° C. although the mixture may be heated up to about 100° C., if desired. In most instances the reaction proceeds smoothly at about 20 to 35° C. in the presence of an alkaline catalyst and hence the application of heat is not necessary and is preferably omitted.

When an acyl halide is used as the acylating agent in the presence of an alkaline substance either anhydrous or aqueous conditions may be employed. In either case the reaction is carried out at a temperature between about 15 and 50° C. but preferably in the range of about 20 to 30° C. When aqueous conditions are used the alkaline catalyst should be chosen so that the acyl groups are not removed by hydrolysis during the reaction. Thus, in the case of easily hydrolyzable acyl groups a weakly alkaline catalyst such as barium carbonate, sodium acetate, calcium carbonate, magnesium carbonate and the like should be used. However, when the acyl groups are of a type more resistant to hydrolysis such as benzoyl or substituted benzoyl radicals, strongly alkaline catalysts such as sodium hydroxide and the like may be employed.

Some specific examples of the alkaline materials which can be used in the above described acylation processes are sodium hydroxide, potassium hydroxide, lithium hydroxide, sodium carbonate, potassium carbonate, sodium bicarbonate, sodium acetate, pyridine, triethylamine, quinoline, N-ethyl morpholine, N-methyl piperidine, calcium hydroxide, calcium carbonate, barium carbonate, magnesium carbonate, barium hydroxide and the like.

The products of the invention are valuable intermediates for the preparation of other organic compounds. They are of particular value as intermediates in the preparation of organic compounds possessing antibiotic activity. For example, the products of the invention which contain the pseudo structural form and no substituents in the phenyl ring can be converted by nitration, hydrolysis, resolution [if necessary] and monodichloroacetylation to [l]-ψ-1-p-nitrophenyl-2-dichloroacetamidopropane-1,3-diol, a compound possessing outstanding and unique antibiotic activity.

The invention is illustrated by the following examples.

Example 1

[a] 500 mg. of [dl]-reg.-1-phenyl-2-dichloroacetamidopropane-1,3-diol is added to a solution consisting of 1 cc. of pyridine and 1 cc. of acetic anhydride and the resulting reaction mixture heated at 100° C. for one-half hour. The reaction mixture is evaporated to dryness under reduced pressure and the residue taken up in and crystallized from methanol. Recrystallization from methanol produces the pure diacetate of [dl]-reg.-1-phenyl-2- dichloroacetamidopropane-1,3-diol [M. P. 94° C.] having the formula,

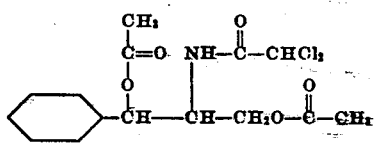

[dl]-Reg. form

[b] 2 g. of [dl]-ψ-1-phenyl-2-dichloroacetamidopropane-1,3-diol is added to a solution consisting of 5 cc. of pyridine and 5 cc. of acetic anhydride and the resulting mixture heated at 100° C. for one-half hour. The reaction mixture is evaporated to dryness under reduced pressure, and the residue taken up in and crystallized from methanol. The product thus obtained is [dl]-ψ-1-phenyl-2- dichloroacetamido-1,3-diacetoxypropane of formula,

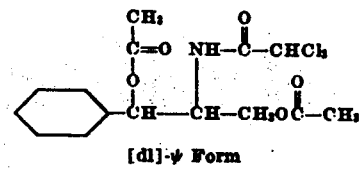

[dl]-ψ Form

Example 2

2 g. of [dl]-ψ-1-phenyl-2-acetamido-3-acetoxypropane-1-ol is added to a mixture composed of 4 cc. of acetic anhydride and 4 cc. of dry pyridine and the resulting mixture heated at 100° C. for one-half hour. The reaction mixture is evaporated in vacuo and the residue recrystallized from methanol to obtain the triacetate of [dl]-ψ-1-phenyl-2-aminopropane-1,3-diol melting at 79° C. Its formula is:

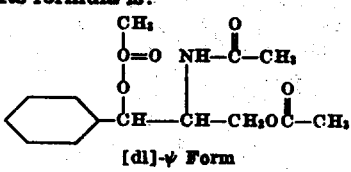

[dl]-ψ Form

Example 3

A solution of 500 mg. of [l]-ψ-1-phenyl-2-aminopropane-1,3-diol in 5 cc. of acetic anhydride is refluxed for three hours. The reaction mixture is evaporated to dryness in vacuo and the residue recrystallized from methanol. This compound has the formula,

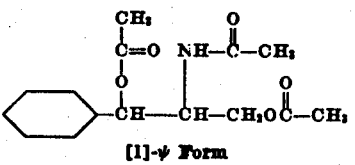

[l]-ψ Form

By substituting an equivalent amount of propionic anhydride for the acetic anhydride used in the above procedure, one obtain [l]-ψ-1-phenyl-2-propionamido-1,3-dipropionyloxypropane.

Example 4

A mixture consisting of 2 g. of [dl]-ψ-1-phenyl-2-aminopropane-1,3-diol, 10 cc. of dry pyridine and 10 cc. of benzoyl chloride is allowed to stand for twenty-four hours, poured into about 300 cc. of ice water and the precipitate collected. The crude tribenzoate of [dl]-ψ-1-phenyl-2-aminopropane-1,3-diol thus obtained is washed with sodium bicarbonate solution, water, dilute hydrochloric acid and finally with water. This product which has the formula,

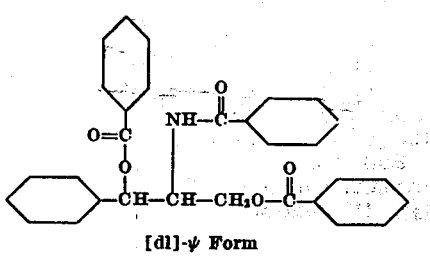

[dl]-ψ Form may be purified by recrystallization from methanol.

Example 5

10 g. of [dl]-reg.-1-phenyl-2-aminopropane-1,3-diol is heated with a mixture consisting of 20 cc. of pyridine and 20 cc. of acetic anhydride for one-half hour at 100° C. The reaction mixture is evaporated to dryness in vacuo to obtain the desired triacetate [M. P. 115–6° C.] of [dl]-reg.-1-phenyl-2-aminopropane-1,3-diol of formula.

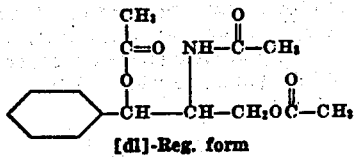

[dl]-Reg. form

Example 6

5 g. of either [dl]-ψ-1-o-methylphenyl-2-acetamido-propane-1,3-diol or [dl]-ψ-1-o-methylphenyl-2-acetamido-3-acetoxypropane-1-ol is added to a mixture consisting of 10 cc. of acetic anhydride and 10 cc. of pyridine and the resulting mixture heated at 100° C. for about one-half hour. The reaction mixture is concentrated to dryness in vacuo and the residual triacetate of [dl]-ψ-1-o-methylphenyl-2-aminopropane-1,3-diol recrystallized from methanol. The formula of this product is:

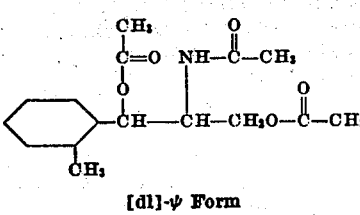

[dl]-ψ Form

Example 7

6 g. of [dl]-reg.-1-o-methyl phenyl-2-amino propane-1,3-diol is heated with 8 cc. of pyridine and 8 cc. of acetic anhydride for one hour at 100° C. and then the reaction mixture evaporated to dryness in vacuo. The residue thus obtained consists of the triacetate of [dl]-reg.-1-o-methylphenyl-2-aminopropane-1,3-diol of formula,

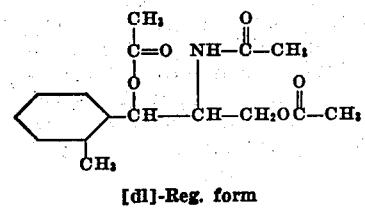

[dl]-Reg. form

Example 8

5 g. of [dl]-ψ-1-m-methoxyphenyl-2-acetamido-2-acetoxy-propane-1-ol is added to a mixture of 10 cc. of acetic anhydride and 10 cc. of pyridine. The resulting mixture is heated at 100° C. for one-half hour and then concentrated to dryness in vacuo. The residual triacetate of [dl]-ψ-1-m-methoxyphenyl-2-aminopropane-1,3-diol is purified by recrystallization from ethanol. Its formula is:

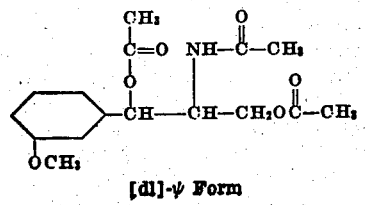

[dl]-ψ Form

Example 9

8 g. of [dl]-reg.-1-[3',4'-dimethylphenyl]-2-aminopropane-1,3-diol is heated at 100° C. for one-half hour with a mixture consisting of 16 cc. of acetic anhydride and 16 cc. of pyridine and the mixture evaporated to dryness in vacuo. The residue consists of the desired triacetate of [dl]-reg.-1-[3',4'-dimethylphenyl]-2-aminopropane-1,3-diol of formula,

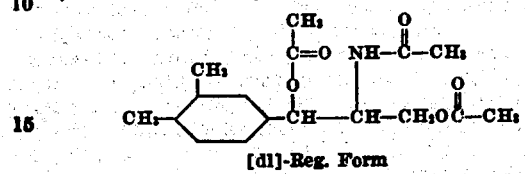

[dl]-Reg. Form

Example 10

A mixture consisting of 8 g. of [dl]-reg.-1-m-methoxy-phenyl-2-aminopropane-1,3-diol, 16 cc. of acetic anhydride and 16 cc. of pyridine is heated at 100° C. for one-half hour and then the reaction mixture evaporated to dryness under reduced pressure. The residual triacetate of [dl]-reg.-1-m-methoxy-phenyl-2-aminopropane-1,3-diol of formula,

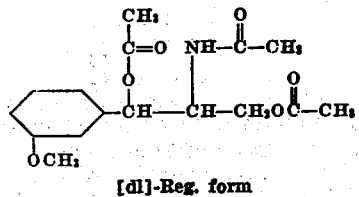

[dl]-Reg. form is purified by recrystallization from ethanol.

Example 11

8 g. of [dl]-ψ-1-acetoxy-2-acetamido-3-phenylbutane-3-ol is heated for one hour at 100° C. with a mixture consisting of 16 cc. of acetic anhydride and 16 cc. of pyridine and then the reaction mixture evaporated to dryness in vacuo. The residue which consists of the triacetate of [dl]-ψ-2-amino-3-phenylbutane-1,3-diol is purified by recrystallization from ethanol. The formula for this product is:

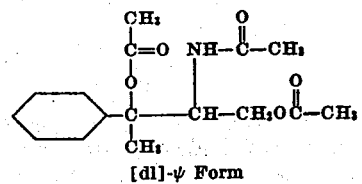

[dl]-ψ Form

Example 12

10 g. of 1-o-chlorophenyl-2-aminopropane-1,3-diol is heated with a mixture composed of 30 cc. of pyridine and 30 cc. of acetic anhydride for about one-half hour at 100° C. The reaction mixture is evaporated to dryness in vacuo and the residue washed with water. The water insoluble product thus obtained is the unresolved triacetate of 1-o-chlorophenyl-2-aminopropane-1,3-diol. This compound which has the formula,

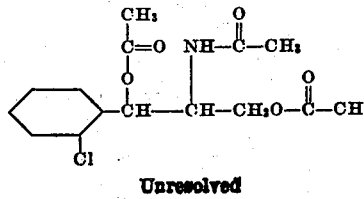

Unresolved

Example 13

8 g. of methoxyacetyl chloride is added slowly with stirring to a solution of 3.34 g. of [dl]-reg.-1-phenyl-2-aminopropane-1,3-diol in 15 cc. of dry pyridine at 0° C. The reaction mixture is allowed to stand for one hour, warmed to 90° C. for one-half hour, treated with 10 cc. of water and evaporated to dryness in vacuo. The residue is dissolved in ethyl acetate, the ethyl acetate solution washed with dilute hydrochloric acid, sodium bicarbonate solution and finally with water. The ethyl acetate solution is dried, the ethyl acetate distilled and the residue crystallized from ether-petroleum ether mixture to obtain the desired [dl]-reg.-1-phenyl-2-methoxyacetamido-1,3-di-(methoxyacetoxy)propane of formula,

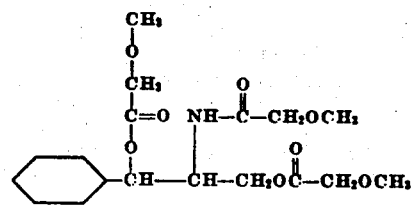

[dl]-Reg. form

Example 14

10 g. of chilled chloroacetyl chloride is added slowly to a well stirred suspension consisting of 7 g. of calcium carbonate, 3.34 g. of [dl]-ψ-1-phenyl-2-aminopropane-1,3-diol, 50 cc. of ethyl acetate and 60 cc. of water at 0° C. The reaction mixture is stirred for one and a half hours, the ethyl acetate layer removed, dried and evaporated to dryness. The residue is crystallized from ethyl acetate-petroleum ether mixture to obtain virtually pure [dl]-ψ-1-phenyl-2-chloroacetamido-1,3-di-(chloroacetoxy)propane of formula,

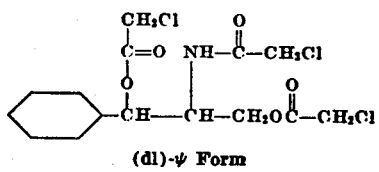

(dl)-ψ Form

Example 15

8 g. of succinic anhydride is added to 4 g. of [dl]-ψ-1-phenyl-2-aminopropane-1,3-diol in 10 cc. of dry pyridine and the reaction mixture heated at 90–100° C. for one hour. 50 cc. of water is added, the pH of the solution adjusted to 2.5–3 with hydrochloric acid and extracted with ethyl acetate. The ethyl acetate extract is washed with dilute hydrochloric acid and with 0.1 volume of water. The ethyl acetate extract is dried, the ethyl acetate distilled and the residue consisting of the desired 1,2,3-trisuccinoyl derivative of [dl]-ψ-1-phenyl-2-aminopropane-1,3-diol purified by crystallization from water. The formula of this product is:

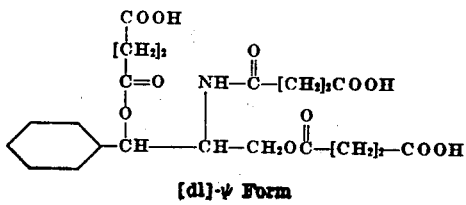

[dl]-ψ Form

Example 16

4 cc. of acetic anhydride is added to a solution consisting of 2 g. of [l]-ψ-1-phenyl-2-cyanacetamidopropane-1,3-diol in 10 cc. of dry pyridine. The reaction mixture is allowed to stand for four hours at room temperature, treated with 5 cc. of warm water and evaporated to dryness in vacuo. Crystallization of the residue from ether-petroleum ether mixture yields the desired [l]-ψ-1-phenyl-2-cyanacetamido-1,3-diacetoxypropane of the formula,

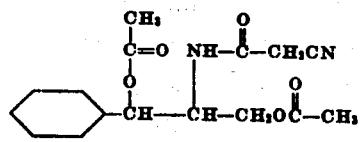

[l]-ψ Form

Example 17

6 cc. of acetic anhydride is added to 2.5 g. of [l]-ψ-1-phenyl-2-lactamidopropane-1,3-diol in 10 cc. of dry pyridine and the mixture heated at 90–100° C. for one-half hour. 5 cc. of water is added, the reaction mixture evaporated to dryness and the residue crystallized from ether-petroleum ether mixture to obtain the desired [l]-ψ-1-phenyl-2-acetoxylactamido-1,3-diacetoxypropane of formula,

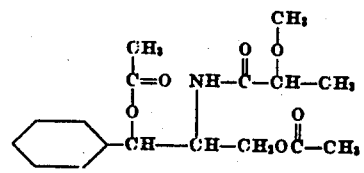

[l]-ψ Form

Example 18

3.5 g. of benzoyl chloride is added in small portions to a vigorously shaken suspension of 2 g. of [dl]-ψ-1-phenyl-2-β,β-dimethylacrylamidopropane-1,3-diol in 40 cc. of cold 1 N sodium hydroxide solution. During the addition the temperature is maintained below 30° C. After the odor of benzoyl chloride has disappeared the solid product is collected and recrystallized from aqueous methanol to obtain the desired [dl]-ψ-1-phenyl-2-β,β-dimethylacrylamido-1,3-dibenzoyloxypropane of formula,

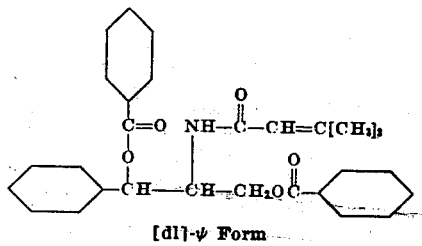

[dl]-ψ Form

Example 19

A solution of 1.1 g. of [l]-ψ-1-phenyl-2-aminopropane-1,3-diol in 50 cc. of ethyl acetate is shaken with 5 g. of p-nitrobenzoyl chloride and sufficient 1 N sodium hydroxide solution to maintain the pH at 8–10. When further additions of alkali show the acid chloride to be completely reacted, the ethyl acetate layer is separated, washed with water, dried and evaporated. The solid residue consists of the desired 1,2,3-tri-p- nitrobenzoyl derivative of [l]-ψ-1-phenyl-2-aminopropane-1,3-diol of formula,

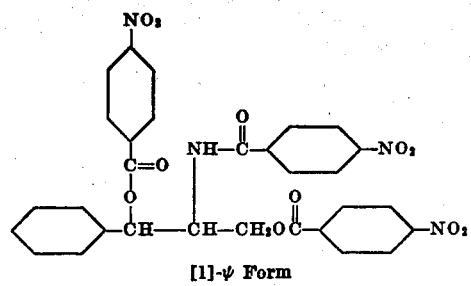

[l]-ψ Form

By substituting 3,4-dichlorobenzoyl chloride for the p-nitrobenzoyl chloride used in the above example, one obtains the corresponding 1,2,3-tri-3,4-dichlorobenzoyl derivative of [l]-ψ-1-phenyl-2-aminopropane-1,3-diol. If desired, an equivalent amount of p-methylbenzoyl chloride can be substituted for the p-nitrobenzoyl chloride to obtain the 1,2,3-tri-p-methylbenzoyl derivative of [l]-ψ-1-phenyl-2-aminopropane-1,3-diol.

*Example 20*

7 g. of phenylacetyl chloride is added to a well-stirred, two-phase mixture consisting of 1.67 g. of [dl]-ψ-1-phenyl-2-aminopropane-1,3-diol, 5 g. of magnesium carbonate, 50 cc. of ethyl acetate, and 20 cc. of water. During the addition the temperature of the reaction mixture is maintained at about 0° C. The reaction mixture is stirred for one hour, the ethyl acetate layer separated, washed with water, dried and the ethyl acetate distilled. The residue, which consists of [dl] - ψ - 1 - phenyl - 2 - phenylacetamido - 1,3 - diphenylacetoxypropane of formula,

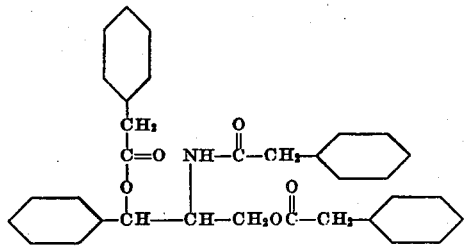

[dl]-ψ Form is purified by crystallization from methanol.

*Example 21*

A mixture consisting of 1.67 g. of [dl]-reg.-1-phenyl-2-aminopropane-1,3-diol, 8 g. of furoic anhydride, and 15 cc. of dry pyridine is heated for one-half hour at 90–100° C. 5 cc. of water is added and then the reaction mixture diluted with 100 cc. of ethyl acetate. The ethyl acetate solution is washed successively with dilute hydrochloric acid, sodium bicarbonate solution and water. The ethyl acetate layer is dried and the ethyl acetate distilled to obtain the desired [dl]-reg. - 1 - phenyl - 2 - furoamido - 1,3 - difuroyloxypropane of formula,

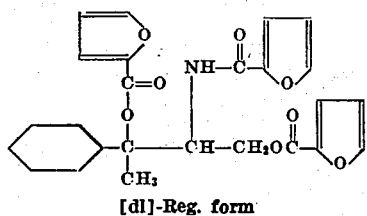

[dl]-Reg. form

This product may be purified by recrystallization from methanol.

*Example 22*

1.67 g. of [dl]-ψ-1-phenyl-2-aminopropane-1,3-diol in 30 cc. of ethyl acetate is added slowly to 7 g. of nicotinoyl chloride hydrochloride in 30 cc. of dry ethyl acetate. 5 g. of pyridine is added slowly to the mixture, keeping the temperature in the neighborhood of about 10° C. After stirring for one hour, 5 cc. of water is added, the ethyl acetate layer separated and washed with water. The ethyl acetate extract is dried, concentrated to a volume of about 10 cc. and diluted with ligroin. After some time the desired 1,2,3-tri-nicotinoyl derivative of [dl]-ψ-1-phenyl-2-aminopropane-1,3-diol separates from the solution in crystalline form. This product has the formula,

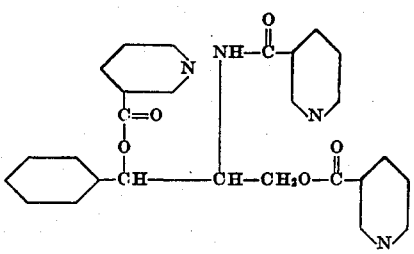

[d]-ψ Form

*Example 23*

A solution consisting of 1.8 g. of [dl]-reg.-1-phenyl-2-bromacetamidopropane-1,3-diol in 10 cc. of acetic anhydride is heated under reflux for about twenty minutes. The excess acetic anhydride and acetic acid are removed by distillation in vacuo and the residue crystallized from ether-petroleum ether mixture to obtain the desired [dl]-reg.-1-phenyl-2-bromacetamido-1,3-diacetoxypropane. This product has the formula,

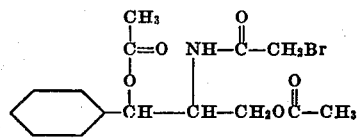

[dl]-Reg. form

*Example 24*

9 g. of phthalic anhydride is added to a solution of 3 g. of [dl]-ψ-1-phenyl-2-aminopropane-1,3-diol in 10 cc. of dry pyridine and the mixture heated at about 100° C. for one hour. 50 cc. of water is added, the pH of the solution adjusted to about 3 with hydrochloric acid and the mixture extracted with ethyl acetate. The ethyl acetate extract is washed with dilute hydrochloric acid, with a small amount of water, and then dried. The ethyl acetate is removed by distillation in vacuo to obtain the desired 1,2,3-triphthaloyl derivative of [dl] - ψ - 1 - phenyl-2-aminopropane-1,3-diol of the formula,

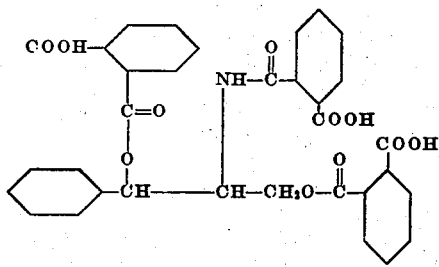

[dl]-ψ Form

In the foregoing examples we have employed a new class of amino diols and their mono and diacyl derivatives as starting materials. These starting materials can be prepared in a number of different ways. One of the general methods which can be used to prepare these products is that represented by the following diagram.

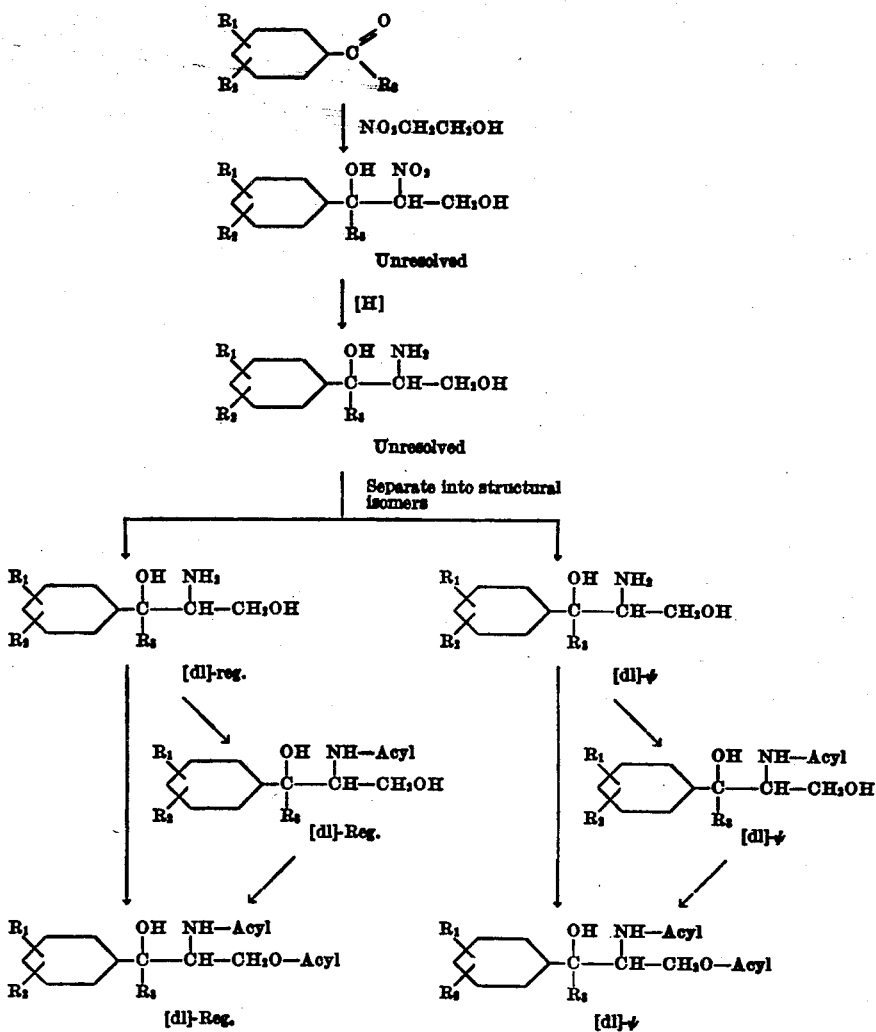

where $R_1$, $R_2$ and $R_3$ have the same significance as given above.

Where optically active starting materials are desired the racemic structural forms of the free amino diols are resolved into their optical isomers via an optically active acid addition salt, suitable acids being [d]-tartaric, [d]-camphor sulfonic, [d]-bromocamphor sulfonic and [d]-mandelic. The optically active amino diols so obtained can be used as starting materials per se or converted by acylation, as shown above, to the optically active mono- and di-acyl starting materials of the invention. Where an unresolved starting material is desired the separation into the structural forms shown on the diagram is omitted.

The following examples serve to illustrate the application of this general method to the preparation of some of the specific starting materials used in the foregoing examples.

*Example 25*

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro diol having the formula,

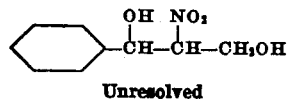

Unresolved can be obtained by acidification of the salt.

20 g. of the sodium salt of 1-phenyl-2-nitropropane-1,3-diol [prepared by the above method] is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated and the residue recrystallized from chloroform. The white crystalline product thus obtained is [dl]-reg.-1-phenyl-2-aminopropane-1,3-diol [M. P. 103–4° C.] of formula,

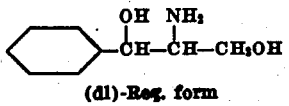

(dl)-Reg. form

The chloroform filtrate from the crystallization of the [dl]-reg.-1-phenyl-2-aminopropane-1,3-diol is evaporated to dryness and the residue heated with an excess of acetic anhydride at 70° C. for fifteen minutes. The reaction mixture is evaporated to dryness in vacuo and the residue recrystallized from ethanol. This white crystalline product which melts at 167–8° C. is [dl]-ψ-1-phenyl-2-acetamido-3-acetoxypropane-1-ol. It can be represented by the following formula,

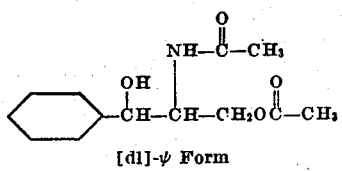

[dl]-ψ Form

If desired, the [dl]-ψ-1-phenyl-2-aminopropane-1,3-diol can be separated from the starting material used in the above procedure by fractional crystallization. This same product can also be obtained by hydrolysis of the pure [dl]-ψ-1-phenyl-2-acetamido-3-acetoxypropane prepared above. This latter procedure is illustrated in the next example.

Example 26

4 g. of [dl]-ψ-1-phenyl-2-acetamido-3-acetoxypropane-1-ol in 25 cc. of 3 N hydrochloric acid is refluxed for about three hours and the reaction mixture evaporated to dryness in vacuo. The residual hydrochloride salt is taken up in a small amount of water, the solution made alkaline with sodium hydroxide and extracted with ethyl acetate. After drying, the ethyl acetate is evaporated from the extracts in vacuo to obtain the free base of [dl]-ψ-1-phenyl-2-aminopropane-1,3-diol; M. P. 86–7° C. This product has the formula,

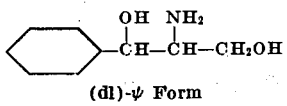

(dl)-ψ Form

The free base of [dl]-ψ-1-phenyl-2-aminopropane-1,3-diol obtained above is dissolved in 60 cc. of warm n-butanol containing 5 g. of [d]-camphor sulfonic acid and the mixture cooled. The solid which separates is collected, recrystallized twice from n-butanol and dissolved in a small amount of water containing an excess of sodium hydroxide. The solution is extracted with ethyl acetate, the ethyl acetate extracts dried and the solvent distilled in vacuo. The residue which consists of [l]-ψ-1-phenyl-2-aminopropane-1,3-diol has the formula,

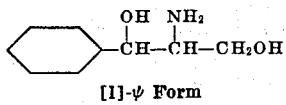

[l]-ψ Form 2 g. of [l]-ψ-1-phenyl-2-aminopropane-1,3-diol is heated with an excess of acetic anhydride at 75° C. for about fifteen minutes. The reaction mixture is evaporated to dryness in vacuo at low temperature and the residue crystallized from ethanol to obtain the desired [l]-ψ-1-phenyl-2-acetamido-3-acetoxypropane-1-ol of formula,

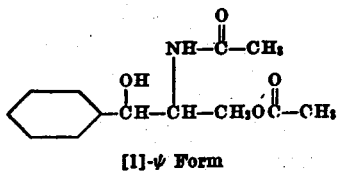

[l]-ψ Form 1 g. of [l]-ψ-1-phenyl-2-aminopropane-1,3-diol is heated with 10 cc. of ethyl acetate under reflux for about ten hours. The ethyl acetate is removed by distillation in vacuo, the residue treated with water, extracted with ethyl acetate and the ethyl acetate extract washed with dilute hydrochloric acid. The ethyl acetate extract is washed with dilute sodium bicarbonate solution, then with water and dried. Evaporation of the ethyl acetate, followed by crystallization of the residue from ethylene dichloride, yields the desired [l]-ψ-1-phenyl-2-acetamidopropane-1,3-diol of formula,

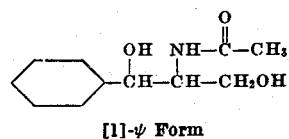

[l]-ψ Form

Example 27

2 g. of [dl]-reg.-1-phenyl-2-acetamidopropane-1,3-diol is heated with an excess of acetic anhydride at 70° C. for a short time. The reaction mixture is evaporated to dryness in vacuo and the residual [dl]-reg.-1-phenyl-2-acetamido-3-acetoxypropane-1-ol purified by recrystallization from ethanol. This product's formula is:

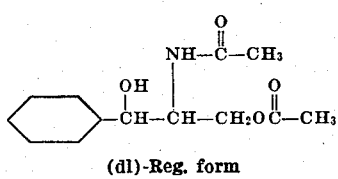

(dl)-Reg. form 1.7 g. of [dl]-reg.-1-phenyl-2-aminopropane-1,3-diol is treated with 1.6 g. of methyl dichloroacetate and the mixture heated at 100° C. for one and one-quarter hours. The residue is washed with two 20 cc. portions of petroleum ether and the insoluble product collected. Recrystallization from ethyl acetate yields the desired [dl]-reg.-1-phenyl-2-dichloroacetamidopropane-1,3-diol in pure form; M. P. 158–9° C. This product's formula is:

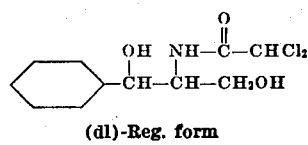

(dl)-Reg. form

Example 28

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methylphenyl-2-nitropropane-1,3-diol removed by filtration, washed with ether and dried. Acidification of this sodium salt produces the corresponding free nitro compound, 1-o-methylphenyl-2-nitropropane-1,3-diol, which has the formula,

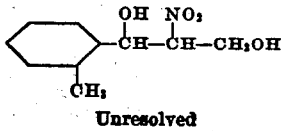

Unresolved 18 g. of the sodium salt of 1-o-methylphenyl-2-nitropropane-1,3-diol is dissolved in 175 cc. of glacial acetic acid, 0.75 g. of palladium oxide hydrogenation catalyst added and the mixture hydrogenated under three atmospheres pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the [dl]-reg. and [dl] - ψ - 1 - o - methylphenyl - 2 - aminopropane-1,3-diol is taken up in and crystallized from chloroform to obtain the [dl]-reg.-1-o-methylphenyl-2-aminopropane-1,3-diol in crystalline form. Its formula is:

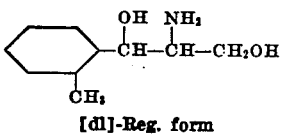

[dl]-Reg. form

The chloroform filtrate from which the [dl]-reg. - 1 - o - methylphenyl - 2 - aminopropane-1,3-diol has been removed is evaporated in vacuo to obtain the crude [dl]-ψ-1-o-methylphenyl-2-aminopropane-1,3-diol.

The crude [dl]-ψ-1-o-methylphenyl-2-aminopropane-1,3-diol is treated with an excess of acetyl chloride at about room temperature in a solvent of dry benzene. When a considerable amount of the hydrochloride salt of [dl]-ψ-1-o-methylphenyl-2-aminopropane-1,3-diol has separated from the solution the reaction is stopped by the addition of 300 cc. of water. After thorough mixing the aqueous solution is removed and saved for recovery of the unacetylated amino diol. The benzene solution is washed with dilute sodium bicarbonate solution and then dried. The benzene is removed by distillation in vacuo and the crude [dl]-ψ-1-o-methylphenyl-2-acetamidopropane-1,3-diol taken up in alcohol and purified by recrystallization from alcohol. The formula of this product is:

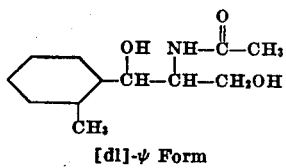

[dl]-ψ Form 3 g. of crude [dl]-ψ-1-o-methylphenyl-2-aminopropane-1,3-diol is heated with an excess of acetic anhydride at about 70 to 80° C. for fifteen minutes and then the reaction mixture evaporated in vacuo. The residue which consists of [dl]-ψ-1-o-methylphenyl-2-acetamido-3-acetoxypropane-1-ol has the formula,

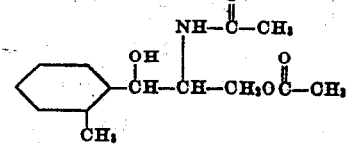

[dl]-ψ Form and is purified by recrystallization from ethanol.

*Example 29*

The starting materials having as the root of their formulae the structure,

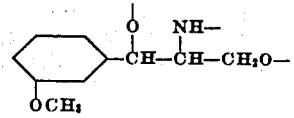

can be obtained by starting with m-methoxybenzaldehyde and β-nitroethanol and applying the procedures described in Examples 25, 26 and 27.

*Example 30*

The starting materials which have as the root of their formulae the structure,

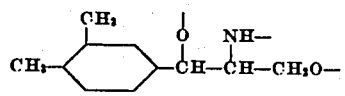

can be prepared by starting with 3,4-dimethylbenzaldehyde and β-nitroethanol and following the procedures described in Examples 25, 26 and 27.

*Example 31*

The compounds used as starting materials in the preparation of the amino diols having the general formula,

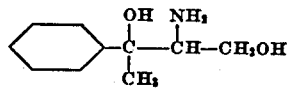

are prepared by starting with acetophenone and β-nitroethanol and following the procedures described in Examples 25, 26 and 27.

*Example 32*

The products used as starting materials having as the root of their formulae the structure,

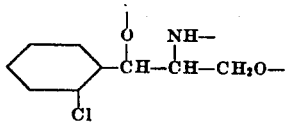

can be prepared from o-chlorobenzaldehyde and β-nitroethanol using the procedures described in Examples 25, 26 and 27. However, the reduction of the 1-o-chlorophenyl-2-nitropropane-1,3-diol intermediate is preferably carried out by the use of stannous acetate or chloride in acetic acid rather than by the use of the catalytic means shown in the aforementioned examples.

Some of the subject matter disclosed but not claimed herein, is disclosed and claimed in our copending applications filed on even date herewith, Serial Nos. 76,172, 76,173, 76,174, 76,175, 76,177 (now Patent No. 2,514,376), 76,178 (now Patent No. 2,514,377), 76,179 (now Patent No. 2,483,885) and 76,180.

What we claim is:
1. A compound of the formula,

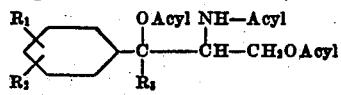

where $R_1$ and $R_2$ are members of the class consisting of hydrogen, halogen, lower alkyl and lower alkoxy radicals and $R_3$ is a member of the class consisting of hydrogen and lower alkyl radicals; said acyl being a carboxylic acid acyl radical.

2. A compound of the formula,

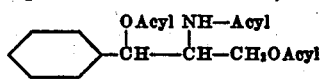

said acyl being a carboxylic acid acyl radical.

3. A compound of the formula,

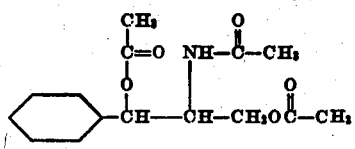

4. A compound of the formula,

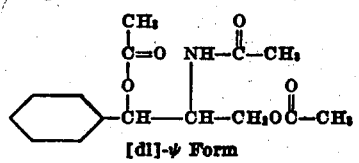

[dl]-ψ Form

5. A compound of the formula,

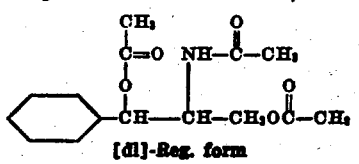

[dl]-Reg. form

6. A compound of the formula,

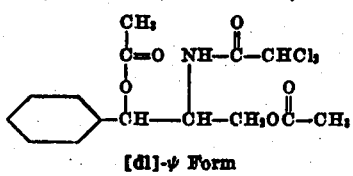

[dl]-ψ Form 7. 1-phenyl-2-(dichloroacetamido)-1,3-diacetoxy-propane.

8. A compound of the formula,

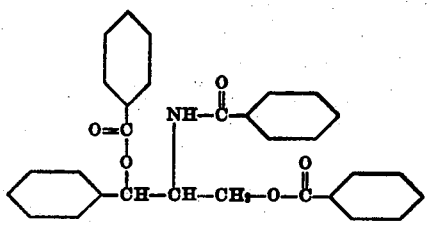

HARRY M. CROOKS, Jr.
MILDRED C. REBSTOCK.
JOHN CONTROULIS.
QUENTIN R. BARTZ.

REFERENCES CITED

The following references are of record in the file of this patent:

UNITED STATES PATENTS

| Number | Name | Date |
|---|---|---|
| 2,103,266 | Lott | Dec. 28, 1937 |